United States Patent Office 3,578,422
Patented May 11, 1971

3,578,422
EMULSION RESISTANT FUEL COMPOSITIONS
Casper John Dorer, Jr., Lyndhurst, Ohio, assignor to
The Lubrizol Corporation, Wickliffe, Ohio
No Drawing. Filed Mar. 3, 1969, Ser. No. 804,015
Int. Cl. C10l 1/18, 1/22
U.S. Cl. 44—63        14 Claims

ABSTRACT OF THE DISCLOSURE

Fuel compositions containing additive combinations consisting of at least (1) one ashless dispersant, (2) an ammonium or amine salt of sulfonic acid, and (3) an oil-soluble polyether. A typical fuel could contain at least one acylated nitrogen material prepared by reacting a hydrocarbon substituted succinic acid anhydride and an ethylene polyamine, at least one ammonium salt of a petrosulfonic acid, and a polyglycol.

This invention relates to additive combinations useful in water-immiscible, organic liquids of the type commonly employed as solvents, fuels, and lubricants. More particularly, the invention relates to additive combinations which improve the water-tolerance capabilities of water-immiscible, organic liquids which contain a minor amount of an ashless dispersant. The invention is especially concerned with an additive combination for improving the water-tolerance characteristics of normally liquid petroleum distillate fuels containing a minor amount of an ashless dispersant.

It is now a conventional practice to incorporate minor amounts of various ashless dispersants into organic liquids, for example, fuels and lubricants, in order to promote the suspension therein of various contaminants, sludges, foreign particles and the like. By retaining these undesirable materials in suspension in the liquid involved, it is possible to reduce or eliminate the amount of material which is deposited upon the surfaces of the liquid-retaining vessel. Such deposits tend to clog orifices such as valves, fuel lines and other tubing or piping filters, and the like. For this reason, ashless dispersants have been widely employed in both fuels and lubricants. However, these ashless dispersants tend to promote the formation of emulsions in organic liquids when the liquids are brought into contact with water. Ordinarily, these liquids are exposed to at least small amounts of water in their ordinary course of storage, shipping, and use. For example, water tends to form as a condensate in fuel tanks, storage tanks, and the like.

Obviously, it is desirable to eliminate or reduce the formation of these emulsions. For example, in fuels, the water-containing emulsion is subject to freezing and thereby interfering with fuel flow by obstructing fuel lines and valves and ports etc. Likewise, the formation of these emulsions in the bottoms of fuel storage tanks, results in a waste of that fuel incorporated into the emulsion. Similarly, disposal of these emulsions presents problems due to their fuel content.

The combination of such water-immiscible organic liquids and water generally does not result in the formation of a stable emulsion. Rather, upon standing, two distinct phases separate—the organic phase and the water phase. Separation of the water and organic liquid from such a two-phase system is readily accomplished with little loss of the organic liquid. Obviously, it would be desirable to have an additive which would prevent the formation of the emulsion and/or break the emulsion if formed without any undue adverse affect on the ashless dispersant.

It has now been determined that a combination of at least one ashless dispersant, at least one oil-soluble ammonium or amine salt of a sulfonic acid, and at least one oil-soluble polyether is capable of reducing or eliminating the formation of these undesirable emulsions when employed in organic liquids without significantly affecting the dispersing capabilities of the ashless dispersant.

In accordance with the foregoing, it is a principal object of this invention to provide compositions useful as additives in water-immiscible organic liquids. A further object is to provide additive combinations capable of improving the water-tolerance of water-immiscible organic liquids. A still further object is to provide an additive combination which is capable of eliminating or reducing the formation of emulsions in water-immiscible organic liquids containing water. An additional object is to provide compositions comprising a major amount of water-immiscible organic liquid and a minor amount of an additive combination according to the present invention. Another principal object is to provide fuel compositions containing the additive combination of this invention. Still another object is to provide fuel compositions comprising a major amount of a normally liquid petroleum distillate fuel and, at least one ashless dispersant and a minor amount of the additive combination. An additional object is to provide gasoline compositions comprising a major amount of a petroleum distillate fuel boiling in the gasoline range and a minor amount of an additive combination according to this invention comprising as an ashless dispersant, at least one oil-soluble acylated nitrogen compound characterized by the presence within its structure of a substituted-polar group selected from the class consisting of acyl, acylimidoyl, and acyloxy radicals having at least about fifty aliphatic carbon atoms in the substituents and a nitrogen-containing group characterized by a nitrogen atom attached directly to said polar group.

These and other objects of this invention can be achieved by providing additive combinations comprising at least one oil-soluble ashless dispersant, at least one oil-soluble ammonium or amine salt of an organic sulfonic acid, and at least one oil-soluble polyether. This additive combination can then be combined with one or more water-immiscible organic liquids such as fuels to provide other compositions falling within the scope of the present invention. Alternatively, each of the components of the additive combination can be independently added to the water-immiscible organic liquids so as to form the additive combination in situ. The additive combination and other compositions contemplated by the present invention are described in detail hereinafter.

As used herein, the terminology "ashless dispersant" is intended to describe the now well-known class of non-metal-containing oil-soluble polymeric additives or the acyl derivatives of relatively high molecular weight carboxylic acids which are capable of dispersing contaminants and the like in organic liquids as discussed above. The carboxylic acids may be mono or polycarboxylic acids and they are generally characterized by substantially hydrocarbon substituents containing an average of at least thirty and, preferably, at least fifty aliphatic carbon atoms. Examples of these ashless dispersants are described in U.S. Pat. 3,265,474 which is incorporated herein by reference for the sake of brevity. However, the preferred ashless dispersants are the acylated nitrogen compounds and esters prepared by reacting at least one substituted mono- or polycarboxylic acid acylating agent with at leat one member of the group consisting of nitrogen-containing compounds characterized by the presence therein of at least one H—N< group, mono- or polyhydroxy-substituted phenols or naphthols, mono- or polyhydroxyl-substituted aliphatic or cycloaliphatic alcohols, or a combination of any of these. These preferred ashless dispersants, that is, acylated nitrogen compounds and esters of mono- or polycarboxylic acids, are discussed in U.S. Pats. 3,172,892; 3,202,678; 3,219,666; 3,272,746; 3,310,492; 3,311,558; 3,331,776; 3,340,281; 3,341,542; 3,346,354; 3,373,111; 3,361,673; 3,381,022; 3,399,141; 3,401,118. For the sake of brevity, these patents and the corresponding foreign publications are incorporated by reference for their extensive disclosure of this known, preferred class of ashless dispersants.

The most preferred class of ashless dispersants for use with the additive combination of this invention are the acylated nitrogen compositions produced by reacting at least one hydrocarbon-substituted succinic acid or anhydride having an average of at least about fifty aliphatic carbon atoms in the hydrocarbon group with at least one alkylene polyamine in an equivalent ratio of acid or anhydride to alkylene polyamine of from about 1:1 to aobut 1:5. As discussed in detail in the above-incorporated patents, the hydrocarbon-substituted succinic acids or anhydrides can be prepared through a variety of techniques. In one such method a polymerized olefin, usually a polymerized 1-monoolefin having an average molecular weight of about 700–5000 such as polyisobutene having an average molecular weight of about 900–1100, is reacted with at least one member of the group of maleic anhydride, maleic acid, chloromaleic acid or anhydride, fumaric acid, itaconic acid or anhydride, citraconic acid or anhydride, mesaconic acid, etc., to prepare the corresponding polyisobutenyl-substituted succinic acid derivative. According to another process, an aliphatic hydrocarbon having an average molecular weight of about 700 to about 5000, such as the above-mentioned polymers, is first chlorinated to produce the corresponding chlorinated hydrocarbon, for example, a chlorinated polyisobutene, and this chlorinated hydrocarbon is then reacted with one or more of the foregoing unsaturated acids or anhydrides to produce the corresponding substituted succinic acid product.

The resulting hydrocarbon-substituted succinic acid or anhydrides or equivalent acylating agents thereof are then reacted with various alkylene polyamines to produce a reaction mixture comprising a mixture of acylated amine products, for example, amine salts, amides, imides, and amides. This process is usually carried out by heating a mixture of the hydrocarbon-substituted succinic acid compound and the alkylene polyamine at a temperature above about 80° C., preferably within the range from about 100° C. to about 250° C. When the acid or anhydride is employed, the process may be carried out at a lower temperature such as room temperature to obtain products having predominantly salt linkages or mixed salt-amide linkages. Such salt-amide products may be converted, if desired, to reaction products having predominantly amide, imide, or amidine groups or mixtures thereof by heating to temperatures above about 80° C. and preferably at 100° C.–250° C. The use of a substantially inert organic liquid dilutent or solvent such as benzene, toluene, naphthas, mineral oil, xylene, n-hexane, cyclo hexane, mixtures thereof, and the like is often desirable and facilitates control of the reaction temperature, filtration of the final reaction mass, etc.

The relative proportions of the hydrocarbon-substituted succinic acid acylating agents and the alkylene polyamines are such that at least about one half of a stoichiometrically equivalent amount of the nitrogen-containing reactant is used for each equivalent of the acid-producing compound employed. The equivalent weight of an alkylene polyamine or other nitrogen-containing reactant is based upon the number of the nitrogen-containing radicals defied by the structural configuration H—N<. Similarly, the equivalent weight of the hydrocarbon-substituted succinic acid or anhydride or other equivalent acylating agent (e.g., acyl halide; ester, particularly lower alkyl esters, etc.) is based upon the number of carboxylic acyl radicals defined by the structural configuration

Thus, ethylene diamine has two equivalents per mole; tetraethylene pentamine has five equivalents per mole; and alkyl or alkenyl-sustituted succinic acid or anhydride or other equivalent succinic acid acylating derivative thereof has two equivalents per mole, etc.

The upper limit of the useful amount of the nitrogen-containing reactant appears to be about two moles for each equivalent of the acylating agent. Such amount is utilized, for instance, in the formation of products having predominantly amidine linkages. Beyond this limit, the excess amount of the nitrogen-containing reactant appears not to take part in the reaction and thus simply remains in the product apparently without any adverse effects. On the other hand, the lower limit of about one half equivalent of the nitrogen containing reactant used for each equivalent of the acid-producing compound is based upon the stoichiometry involved in the formation of the products having predominantly imide linkages.

The preferred alkylene polyamine reactants correspond for the most part to the formula

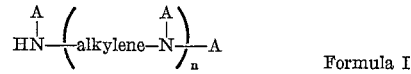

Formula I wherein n is an integer of from one to ten, A is a hydrocarbon group, substantially hydrocarbon group, or hydrogen and the alkylene radical is a straight or branched chain alkylene radical having up to seven carbon atoms therein. These alkylene polyamines include methylene polyamines, ethylene polyamines, propylene polyamines, butylene polyamines, pentylene polyamines, hexylene polyamines, heptylene polyamines, and cyclic alkylenes polyamines such as piperazines, homopiperazines, N-(aminoalkyl)-piperazines, N,N'-di(aminoalkyl)-piperazines and the like. These alkylene polyamines are exemplified by ethylene diamine, triethylene tetramine, propylene diamine, octamethylene diamine, tripropylene tetramine, tetraethylene pentamine, pentaethylene hexamine, trimethylene diamine, di(trimethylene)-triamine, 1-(2-aminopropyl)-piperazine, 1,4-bis(2-aminoethyl)-piperazine, and 2-methyl-1-(2-aminobutyl)-piperazine.

In the above formula, the A variables are preferably hydrogen although they can represent other groups such as lower alkyl, hydroxy-lower alkyl, amino-loweralkyl, lower alkoxy-substituted lower alkyl, and the like wherein the alkyl groups thereof contain from one to seven carbon atoms. Preferably, the alkylene groups will be straight or branched chain groups containing two to four carbon atoms. Examples of such polyamines include N-(2-hydroxyethyl)-ethylene diamine, N,N'-bis(2-hydroxyethyl)-ethylene diamine, 1-(2-hydroxyethyl)-piperazine, monohydroxypropyl-substituted diethylene triamine, 1,4-bis(2-hydroxypropyl)-piperazine, N - (3-hydroxypropyl)-tetramethylene diamines, N-isobutyl-ethylene diamine, N-(ethyl)-hexamethylene diamine, and the like.

Within this most preferred class of ashless dispersants a particularly useful group are the reaction products of the previously described hydrocarbon-substituted succinic acid acylating agents, particularly alkyl- or alkenyl-substituted succinic acid acylating agents such as polyisobutenyl-substituted succinic acid or anhydride, and ethylene polyamines of the formula

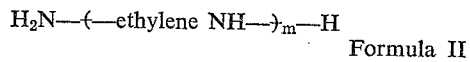

Formula II wherein m is a whole number of from one to ten and, preferably m has an average value of from about two to seven. Ethylene polyamines are described in detail under the heading "Ethylene Amines" in the Encyclopedia of Chemical Technology, Kirk and Othmer, vol. 5, pages 898–905, (1950), and "Diamines and Higher Amines, Aliphatic" in Encyclopedia of Chemical Technology, (2nd ed.), Kirk and Othmer, vol. 7, pages 22–39 (1965), both by Interscience Publishers, New York. Such polyamines are prepared conveniently by the reaction of ethylene chloride and ammonia. The reaction results in the production of somewhat complex mixtures of ethylene polyamines including cyclic polyamines such as piperazines, aminoethyl piperazines, and the like. Such mixtures of polyethylene polyamines are useful in the preparation of the ashless dispersants contemplated herein. Of course, pure ethylene polyamines can be used but, mixtures normally will be used since they are readily available commercially in large quantities.

An especially preferred group of ashless dispersants are the acylated nitrogen compositions prepared by reacting alkyl-or alkenyl-substituted succinic acids or anhydrides having at least about fifty aliphatic carbon atoms in the alkyl or alkenyl substituent with at least one alkylene polyamine of the types described above, especially ethylene polyamines, in amounts such that the equivalent ratio of acid or anhydride to amine is within the range of about 1:1.1 to about 1:3, and preferably from about 1:1.2 to about 1:2. These especially referred dispersants are preferred to herein as "basic dispersants" due to the presence of the excess amine in the acylated nitrogen compositions.

In the past, such basic ashless dispersants have not performed as effectively as the neutral or acidic dispersants with respect to their water-tolerance although their dispersant capabilities are very good. This was unfortunate since, as a general rule, these basic dispersants are particularly effective dispersants for fuels. Nevertheless, in the presence of water, these basic dispersants form stable emulsions in the fuel. However, in the presence of the other components of the additive package contemplated by the present invention, these basic dispersants can be employed effectively in water contaminated fuels.

The second component of the additive combination is an oil-soluble amine or ammonium salt of a sulfonic acid. These amine or ammonium salts are prepared through conventional techniques by neutralizing oil-soluble sulfonic acids of the following general formulae with an amine, ammonia, or mixtures thereof.

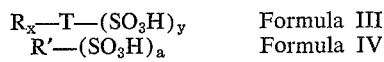

$$R_x\text{—}T\text{—}(SO_3H)_y \quad \text{Formula III}$$
$$R'\text{—}(SO_3H)_a \quad \text{Formula IV}$$

In Formula III, T is cyclic nucleus of the mono- or polynuclear type including benzenoid or hetrocyclic neuclei such as benzene, naphthalene, anthracene, 1,2,3,4-tetrahydronaphthalene, thianthrene, and the like. Ordinarily, however, T will represent an aromatic hydrocarbon neucleus, especially a benzene or naphthalene nucleus. The variable R in the radical $R_x$ is an aliphatic group such as alkyl, alkenyl, alkoxy, alkoxyalkyl, carboalkoxyalkyl, or an aralkyl group and x is at least one with the proviso that the variables represented by the group $R_x$ are such that the amonium and amine salts prepared from such acids are oil-soluble. This means that the groups represented by $R_x$ should contain at least about eight aliphatic carbon atoms per sulfonic acid molecule and preferably at least about twelve aliphatic carbon atoms. Generally x will be an integer of 1–3.

The variable R' in Formula IV is an aliphatic or aliphatic-substituted cycloaliphatic radical. Where R' is an aliphatic radical, it should contain at least about fifteen to about eighteen carbon atoms and where R' is an aliphatic substituted-cycloaliphatic group, the aliphatic substituents should contain a total of at least about twelve carbon atoms. Examples of the R' are alkyl, alkenyl, and alkoxyalkyl radicals and aliphatic-substituted cycloaliphatic radicals wherein the aliphatic substituents are alkoxy, alkoxyalkyl, carboalkoxyalkyl, etc. Generally the cycloaliphatic radical will be a cycloalkane neucleus or a cycloalkene nucleus such as cyclopentane, cyclohexane, cyclohexene, cyclopentene, and the like. Specific examples of R' are cetyl-cyclohexyl, lauryl-cyclohexyl, ceryloxy-ethyl and octadecenyl radicals, and radicals derived from petroleum, saturated and unsaturated paraffin wax, and polyolefins, including polymerized mono- and diolefins containing from about 1 to 8 carbon atoms per olefin monomer unit.

The groups T, R, and R' in Formulae III and IV can also contain other substituents as hydroxy, mercapto, halogen, nitro, amino, nitroso, carboxy, carbolower alkoxy etc.

Illustrative examples of such sulfonic acids are mahogany sulfonic acids, petrolatum sulfonic acids, mono- and polywax-substituted naphthalene sulfonic acids, cetylchlorobenzene sulfonic acids, cetylphenol sulfonic acids, cetylphenol disulfide sulfonic acids, cetoxycapryl benzene sulfonic acids, dicetyl thianthrene sulfonic acids, di-lauryl beta-naphthol sulfonic acids, dicapryl nitronaphthylene sulfonic acids, paraffin wax sulfonic acids, unsaturated paraffin wax sulfonic acids, hydroxy-substituted paraffin wax sulfonic acids, tetraisobutylene sulfonic acids, tetra-amylene sulfonic acids, chloro-substituted paraffin wax, nitrosyl-substituted paraffin wax sulfonic acids, petroleum naphthene sulfonic acids, cetylcyclopentyl sulfonic acids, lauryl cyclohexyl sulfonic acids, mono- and polywax-substituted ccyclohexyl sulfonic acids, and the like.

As used herein, the terminology "petroleum sulfonic acids" or "petrosulfonic acids" is intended to cover that well-known class of sulfonic acids derived from petroleum products according to conventional processes such as disclosed in U.S. Pats. 2,480,638; 2,483,800; 2,717,265; 2,726,261; 2,794,829; 2,832,801; 3,225,086; 3,337,613; 3,351,655; and the like. Sulfonic acids falling within Formula III and IV are discussed in prior U.S. Pats. as 2,616,-904; 2,616,905; 2,723,234; 2,723,235; 2,723,236; 2,777,-874; and the other U.S. Patents referred to in each of these patents. Thus, it is seen that these oil-soluble sulfonic acids are well-known in the art and require no further discussion herein.

The ammonium and amine salts of the foregoing sulfonic acids are either known in the art or can be prepared according to conventional techniques, that is, by simply neutralizing the sulfonic acids with ammonia or the desired amine or mixtures thereof. Due to the relatively strong acidic character of sulfonic acids, neutralization thereof occurs readily when the sulfonic acids are contacted with ammonia or other amines. It is convenient to carry out this neutralization in the presence of substantially inert organic diluents. Suitable diluents include mineral oils, kerosene, aromatic hydrocarbons, chlorinated aromatic hydrocarbons, alkanes, cycloalkanes, and the like such as naphthas, benzene, toluene, chlorobenzenes, hexane, heptane, nonane, cyclopentane, and cyclohexane.

It is not necessary that all of the sulfonic acid be neutralized but at least 75% thereof should be neutralized. Generally, best results are achieved when the ammonium or amine salts employed are substantially free from non-neutralized sulfonic acids. Neutralization is accomplished by contacting at least a stoichiometrically equivalent amount of ammonia, amines, or mixtures thereof, with the sulfonic acids at temperatures of from about 25° C. up to about 100° C. Lower or higher temperatures can be employed in the neutralization process but they generally are unnecessary. Since it is desirable that substantially all of the sulfonic acid be neutralized, a stoichiometric excess of ammonia or amines is usually employed to achieve neutralization.

Amines suitable for neutralizing the sulfonic acids to be used in the present invention can vary considerably and include, for example, primary, secondary, and tertiary amines including mono- and polyamino aliphatic amines, cycloaliphatic amines, aromatic amines, and heterocyclic amines. Such amines are illustrated by methyl amine, ethyl amine, diethyl amine, triethyl amine, ethanol amine, diethanol amine, triethanol amine, propanol amine, dipropanol amine, tripropanol amine, butanol amines, ethylene diamine, diethylene triamine, trimethylene diamine, tripropylene tetramine, pyridine, piperazine, N-(ethyl)-piperazine, aniline, phenylene diamine, naphthylamine, cyclohexyl amine, cyclopentyl amine, and other amines containing up to about twenty carbon atoms. However, the preferred sulfonic acid salts are the ammonium salts so that the preferred neutralizing agent is ammonia. Ammonium and amine salts suitable for use in the present invention are disclosed in such prior U.S. Patents as 2,134,711; 2,822,384; 2,779,784; 2,968,619; and 3,214,462.

As mentioned above, the third essential component of the additive combination of this invention is a polyether. As used herein, the terminology polyether is a generic designation of that class of oil-soluble materials characterized by the presence within their structure of at least one group of the formula $-(\text{O-alkylene})_p-$ wherein the alkylene group is a straight or branched chain alkylene group containing from two to seven carbon atoms and $p$ has an average value of at least five and up to about two hundred. Such polyethers are generally prepared by reacting an active hydrogen containing compound such as alcohols, amines, phenols, phenol-formaldehyde condensation products, carboxylic acids, carboxylic acid esters containing active hydrogen groups in the alcohol or acid moiety (such as a hydroxyl substituent or a primary or secondary amino group) and the like with one or more alkylene oxides such as ethylene oxides, propylene oxides, butylene oxides, and in gneeral alkylene oxides corresponding to the formula

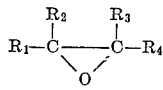

Formula V where $R_1$, $R_2$, $R_3$ and $R_4$ are each independently hydrogen, alkyl, cycloalkyl, alkenyl, aryl, and aralkyl groups. These hydrocarbon groups may contain such substituents as halo, nitro, alkoxy, and the like. Generally, the total number of carbon atoms in the alkylene oxide will not exceed ten and usually will be two to four. Specific examples include ethylene oxide, propylene oxide, 1,3-butylene oxide, epichlorohydrin, 1,2-octylene oxide, styrene oxide, and the like.

Many commercially available polyethers can be used to prepare the combination additive of this invention. For example, General Aniline and Film Corporation supplies a line of surface-active agents sold under the name GAFAC which are suitable polyethers. The preferred GAFAC polyethers are the alkyl phenoxypoly-(ethyleneoxy)ethyl mono- and diesters fo phosphoric acid such as GAFAC RE–610 and RE–960. Other useful polyethers are the reaction products of various organic amines, carboxylic acid amides, and quaternary ammonium salts with ethylene oxide. These polyoxyethylated amines, amides, and quaternary salts are available from Armour Industrial Chemical Co. under the names Ethoduomeen T/20, an ethyleneoxide condensation product of an N-alkyl alkylenediamine produced by Armour under the name Duomeen T; Ethomeen, tertiary amines which are ethyleneoxide condensation products of primary fatty amines; Ethomid, ethylene oxide condensates of fatty acid amines; and Ethoquad, polyoxy ethylated quaternary ammonium salts such as quaternary ammonium chlorides.

The preferred polyethers are polyoxyalkylene polyols and derivatives thereof. This class of materials are commercially available from various sources: Pluronic Polyols from Wyandotte Chemical Corporation; Polyglycol 112–2, a liquid triol derived from ethyleneoxide and propyleneoxide available from Dow Chemical Co.; and Tergitol, dodecylphenyl or nonylphenyl polyethylene glycol ethers, and Ucon, polyalkylene glycols and derivatives, both available from Union Carbide Corp. These are but a few of the commercial products suitable as the polyether component in the improved composition of the present invention.

In addition to the polyols per se, the esters thereof obtained by reacting the polyols with various carboxylic acids are also suitable as the polyether component of the additive combination. Acids, useful in preparing these esters are lauric acid, stearic acid, succinic acid, and alkly- or alkenyl-substituted succinic acids wherein the alkyl- or alkenyl-group contains up to about twenty carbon atoms.

The most preferred polyethers are prepared as block polymers. Thus, a hydroxy-substituted compound, $$R-(OH)n$$

(where $n$ is 1 to 6, and R is the residue of a mono-or polyhydric alcohol, a phenol or alkylated phenol, naphthol or alkylated naphthol, etc.) is reacted with propylene oxide to form a hydrophobic base. This base is then reacted with ethylene oxide to provide a hydrophylic portion resulting in a molecule having both hydrophobic and hydrophylic portions. The relative sizes of these portions can be adjusted by regulating the ratio of reactants, time of reaction, etc., as is obvious to those skilled in the art. Thus it is within the skill of the art to prepare polyols whose molecules are characterized by hydrophobic and hydrophylic moieties which are present in a ratio rendering the polyethers soluble in fuel compositions.

Compounds illustrative of $R-(OH)n$ include alkylene polyols such as the alkylene glycols, alkylene triols, alkylene tetrols, etc., such as ethylene glycol, propylene glycol. glycerol, pentaerythritol, sorbitol, mannitol, and the like. Aromatic hydroxy compounds such as alkylated mono- and polyhydric phenols and naphthols can also be used, e.g., heptylphenol, dodecylphenol, etc.

The liquid polyethers available from Wyandotte Chemicals Co. under the name Pluronic Polyols and other similar polyols are particularly useful polyethers. The Pluronic Polyols corresponds to the formula:

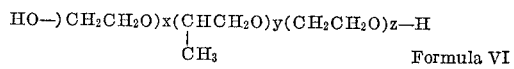

Formula VI wherein $x$, $y$ and $z$ are integers greater than one such that the $CH_2CH_2O$ groups comprise from about 10% to about 40% by weight of the total molecular weight of the polyether, the average molecule weight of said polyether being from about 1000 to about 5000. These products may be prepared by first condensing propylene oxide with propylene glycol to produce the hydrophobic base

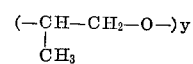

This condensation product is then treated with ethylene oxide to add hydrophylic portions to both ends of the molecule. For best results, the ethylene oxide units should comprise from about 10% to about 40% by weight of the molecule. Those products wherein the molecular weight of the polyether is from about 2500 to 4500 and the ethylene oxide units comprise from about 10% to about 15% by weight of the molecule are particularly suitable.

If more fuel-solubility is needed in a given polyether, the hydrophobic portion can be increased and/or the hydrophylic portion decreased accordingly. If greater emulsion-resisting or emulsion-breaking ability is required, the hydrophylic and/or hydrophobic portions can be adjusted to accomplish this. Obviously, such adjustments of the polyethers generally involve the preparation of another polyether product so that the adjustment in size of the hydrophobic and/or hydrophylic portions can be made by employing more or less of the reactants.

In the additive combinations of this invention, the ashless dispersants, the amine or ammonium salts of the sulfonic acids, and the polyethers, will be present in a weight ratio of 100:$A$:$B$ respectively, where A and B each independently have a value of from at least about 0.25 to about 25. Generally the value of A and B will vary between 0.5 and 5.0. Obviously, if the additive combination is formed in situ in a fuel, this same weight ratio of the three components will be applicable. It should be clear that the foregoing ratio is limited to the active components of the additive combination. Accordingly, any inert diluent present is not taken into consideration in this weight ratio. It is anticipated that the additive combination will generally contain at least one substantially inert organic diluent such as a low viscosity mineral oil, a petroleum distillate fuel such as kerosene or gasoline, liquid hydrocarbons and chlorinated hydrocarbons such as benzene, toluene, xylene, hexane, heptane, chlorobenze, cyclohexane, cyclopentane, etc. This inert diluent is preferably a solvent for the components and, in any event, facilitates mixing of the components and the incorporation of the additive combination into the fuel composition.

The additive combination of this invention will be employed in the fuels in such an amount that it constitutes from about 0.0001 to about 1% by weight of the total fuel composition and preferably from about 0.0005 to about 0.25% by weight of the fuel composition. Obviously, the optimum concentration will depend on the particular fuel and the particular components of the additive combination. However, using the foregoing indicated concentrations as guidelines, the optimum concentration for any given combination of additive and fuel can easily be ascertained by those skilled in the art.

All that is required to prepare the additive combinations of this invention is that the necessary amounts of the components of the additive combination be mixed in suitable ratios at room temperatures, usually in the presence of an inert organic diluent. Similarly, the additive combination can be added to the fuels simply by admixing the combination and fuels at room temperature in the desired proportions, or, as mentioned above, the individual components of the additive combination can be added to the fuel so that the additive combination is formed in situ. Obviously, the additive combination and fuel compositions containing the additives can be prepared at temperatures other than room temperature for example, 0° C., 10° C., 25° C., 40° C., 80° C., 100° C., and the like. Ordinarily there is no particular advantage in using temperatures other than the normal ambient temperature where the mixing is to take place.

Preferred additive combinations of this invention and fuels containing such combinations are illustrated in the following examples.

Example (a) A polyisobutenyl-substituted succinic acid anhydried having an acid number of about 105 and an equivalent weight of about 540 is prepared by reacting chlorinated isobutylene having an avearge molecular weight of about 1050 and a chlorine content of 4.3% with maleic anhydride. The resulting polyisobutenyl-substituted succinic acid anhydride is then reacted with an ethylene polyamine mixture consisting essentially of a 3:1 weight ratio of triethylenetetramine and diethylenetriamine in the presence of xylene. The amount of succinic acid anhydride reactant and amine mixture is such that the equivalent ratio of anhydride to amine is about 1:1.33. The reaction mixture is heated under reflux for four hours while bubbling nitrogen therethrough to assist in the removal of water. The resulting xylene solution of the acylated nitrogen basic dispersant is adjusted to a xylene content of about 30% by weight.

An additive combination illustrative of those of the present invention is then prepared by combining 130 parts by weight of the above xylene solution with 0.5 parts by weight each of an ammonium salt of an oil-soluble sulfonic acid and a polyether according to Formula VI having an average molecular weight of about 2400–2800.

Similarly, by substituting one or more of the ashless dispersants, amine or ammonium sulfonates, and/or polyethers discussed hereinabove, for all or a portion of those in the foregoing example, in the presence or absence of inert organic liquid diluents, other additive combinations of the type contemplated by the present invention can be prepared readily by those skilled in the art. These additive combinations can then be readily incorporated into fuel-compositions by mixing the combinations with a normally liquid fuel, particularly a petroleum distilalte fuel, in the amounts described hereinbefore to prepare fuel compositions falling within the scope of this invention.

The manner in which the amine or ammonium sulfonate coact with the polyethers to improve the water tolerance of the fuel is not understood. From data of the type presented below, it is clear that these two components of the additive combination do coact synergistically in the presence of the ashless dispersants. This data is based on results obtained in the Socony-Mobil Multiple Contact Water Reaction Test. The additive combination employed in the following test contains an ashless dispersant of the type prepared according to part (a) of the above illustrative example, a di-(propylenetetramer)-substituted naphthalene sulfonic acid ammonium salt, xylene, and commercially available polyether in the amounts indicated.

This test comprises placing 100 milliliters of the test fuel and 10 milliliters of distilled water in a glass container. The container and contents are then agitated on an Eberbach Model 6000 reciprocating laboratory shaker for five minutes at 5-cycles per second. The container is then removed and placed in a darkened storage area. At the end of twenty-four hours of storage, appearance of the fuel layer, oil-water interface, and water layer is evaluated and rated on a scale of 0 to 11. Thereafter, the fuel layer is siphoned off and replaced with 100 milliliters of fresh test fuel. The procedure is then repeated for a total of up to 10 times or until such time as the water layer is completely emulsified after the twenty-four hour storage period. The rating is such that 0 represents optimum results, that is, there is a clean break on the interface of the fuel and water and there is no dirt, "skin," or bubbles present. On the other hand, a rating of 11 indicates a completely solid emulsion.

TABLE

| Ashless dispersant [1] | Xylene | Ammonium sulfonate [1] | Polyether A | Polyether B | Polyether C | Additive concentration (lbs./1,000 barrels) | Rating after cycle No. 1 | 2 | 3 | 4 | 5 | 6 | 7 | 8 | 9 | 10 |
|---|---|---|---|---|---|---|---|---|---|---|---|---|---|---|---|---|
| (a) | | | | | | | 0–1 | 0–1 | 1 | 1–2 | 2–3 | 3 | 3–4 | 3–4 | 3–4 | 3–4 |
| (b) | 100 | | | | | 21 | 6 | 8–9 | 10 | 11 | 11 | 11 | 11 | | | |
| (c) | 60 | 37 | 1 | | | 34 | 6–7 | 8 | 10 | 10 | 10–11 | 11 | 11 | 11 | | |
| (d) | 60 | 39.5 | 0.5 | | | 35 | 7 | 9 | 9 | 11 | 11 | 11 | | | | |
| (e) | 60 | 37 | 0.5 | 1 | | 34.5 | 7–8 | 9 | 10 | 11 | 11 | 11 | | | | |
| (f) | 60 | 37 | 1.5 | | | 35 | 3–4 | 7–8 | 10–11 | 11 | 11 | 11 | 11 | 11 | 11 | |
| (g) | 60 | 37 | 1.5 | 0.5 | 1 | 35 | 7 | 7–8 | 9–10 | 10 | 0 | 0 | 0–1 | 0–1 | 0–1 | 0–1 |
| (h) | 60 | 37 | 2 | | 1 | 35 | 6 | 8 | 0–1 | 0 | 0 | 0 | 0 | 0 | 0 | 0 |
| (i) | 60 | 37 | 2 | | 1 | 35 | 0 | 1 | 1 | 1 | 1 | 0–1 | 1 | 1 | 1 | 1 |

[1] Same ashless dispersant is used in (b)–(i) and same ammonium sulfonate is used in (b)–(g). The ammonium sulfonate is a solution of the sulfonate, the solvent comprising 66% by weight thereof. The ammonium sulfonate contains unneutralized sulfonic acid groups, i.e., the equivalent ratio of $-SO_3H$ groups therein to $NH_3$ groups is 1:0.8. The ammonium sulfonate of (h) and (i) is a solution thereof containing 33% by weight ammonium sulfonate, i.e., ammonium sulfonate which is completely neutralized. Polyether A is a polyalkylene glycol sold by Union Carbide Corporation as UCON LB–1800–X. Polyether B is an oxyethylated low molecular weight phenol-aldehyde polymer. Polyether C is a commercially available polyalkylene glycol sold by Dow Chemical Company as Polyglycol 112–2.

What is claimed is:

1. An additive combination soluble in normally liquid fuels comprising a mixture of (1) at least one oil-soluble ashless dispersant, (2) at least one oil-soluble ammonium or amine salt of a sulfonic acid, and (3) at least one oil-soluble polyether characterized by the presence within its structure of a group of the formula $\text{-(O-alkylene)}_p\text{-}$ wherein the alkylene group is a straight or branched chain alkylene group containing from two to seven carbon atoms and where $p$ has an average value of at least five to about two hundred; in which the weight ratio of (1): (2): (3) is within the range of about $100:A:B$ wherein each of A and B is within the range of 0.25 to about 25.

2. An additive combination according to claim 1 wherein (3) is further characterized by a hydrophobic base comprising $$-\text{CH}-\text{CH}_2-\text{O}-$$
$$\qquad |$$
$$\quad\text{CH}_3$$

units and a hydrophilic portion comprising $$-\text{CH}_2\text{CH}_2\text{O}-$$

units where the total number of $$-\text{CH}-\text{CH}_2-\text{O}- \text{ and } -\text{CH}_2\text{CH}_2\text{O}-$$
$$\qquad |$$
$$\quad\text{CH}_3$$

units does not exceed about two hundred, wherein the weight ratio of (1): (2): (3) is within the range of about $100:A:B$ wherein each of A and B is within the range of 0.25 to about 25.

3. An additive combination according to claim 1 wherein there is present in said combination at least one substantially inert organic liquid diluent for said mixture.

4. A composition according to claim 3 wherein (3) in a block polymer polyether characterized by an average molecular weight of about 1000 to about 5000 in which the $-\text{CH}_2\text{CH}_2\text{O}-$ units comprise from about 10% to about 40% by weight of said average molecular weight.

5. An additive combination according to claim 4 wherein (1) is an acylated nitrogen composition selected from the class consisting of the reaction products of hydrocarbon-substituted succinic acids or anhydrides having at least about fifty aliphatic carbon atoms in the hydrocarbon substituent and an alkylene polyamine or mixtures thereof which have been reacted in an equivalent ratio of acid or anhydride to alkylene polyamine of from about 1:1 to about 1:5 at a temperature of from about 80° C. to about 250° C.; wherein (2) is an oil-soluble ammonium salt of at least one aliphatic hydrocarbon-substituted naphthalene sulfonic acid or aliphatic hydrocarbon-substituted benzene sulfonic acid; and wherein each of A and B is between 0.5 and 5.0.

6. An additive combination according to claim 5 wherein (1) is further characterized as being the reaction product of an alkyl- or alkenyl-substituted succinic acid or anhydride and an ethylene polyamine or mixtures of ethylene polyamines.

7. An additive combination according to claim 6 wherein said equivalent ratio is about 1:1.1 to about 1:3.

8. An additive combination according to claim 7 wherein (3) is further characterized as having an average molecular weight of about 2500 to 4500 and the $$-\text{CH}_2\text{CH}_2\text{O}-$$

units comprise about 10% to about 15% by weight of this average molecular weight.

9. A fuel comprising a major amount of a petroleum distillate fuel and a minor amount of an additive combination according to claim 1.

10. A fuel composition comprising a major amount of a petroleum distillate fuel and a minor amount of an additive combination according to claim 4.

11. A fuel composition comprising a major amount of a petroleum distillate fuel and a minor amount of an additive combination according to claim 5.

12. A fuel comprising a major amount of a petroleum distillate fuel boiling in the gasoline range and a minor amount of an additive combination according to claim 6.

13. A fuel composition comprising a major amount of a petroleum distillate fuel boiling in the gasoline range and a minor amount of an additive combination according to claim 7.

14. A fuel composition comprising a major amount of a petroleum distillate fuel boiling in the gasoline range and a minor amount of an additive combination according to claim 8.

References Cited
UNITED STATES PATENTS

| | | | |
|---|---|---|---|
| 2,684,292 | 7/1954 | Caron et al. | 44—72X |
| 3,265,474 | 8/1966 | Siegel | 44—62 |
| 3,424,565 | 1/1969 | Ptacek et al. | 44—62X |
| 3,443,918 | 5/1969 | Kautsky et al. | 44—63 |

DANIEL E. WYMAN, Primary Examiner

W. J. SHINE, Assistant Examiner

U.S. Cl. X.R.

44—71, 72, 74, 77